United States Patent Office 2,937,888
Patented May 24, 1960

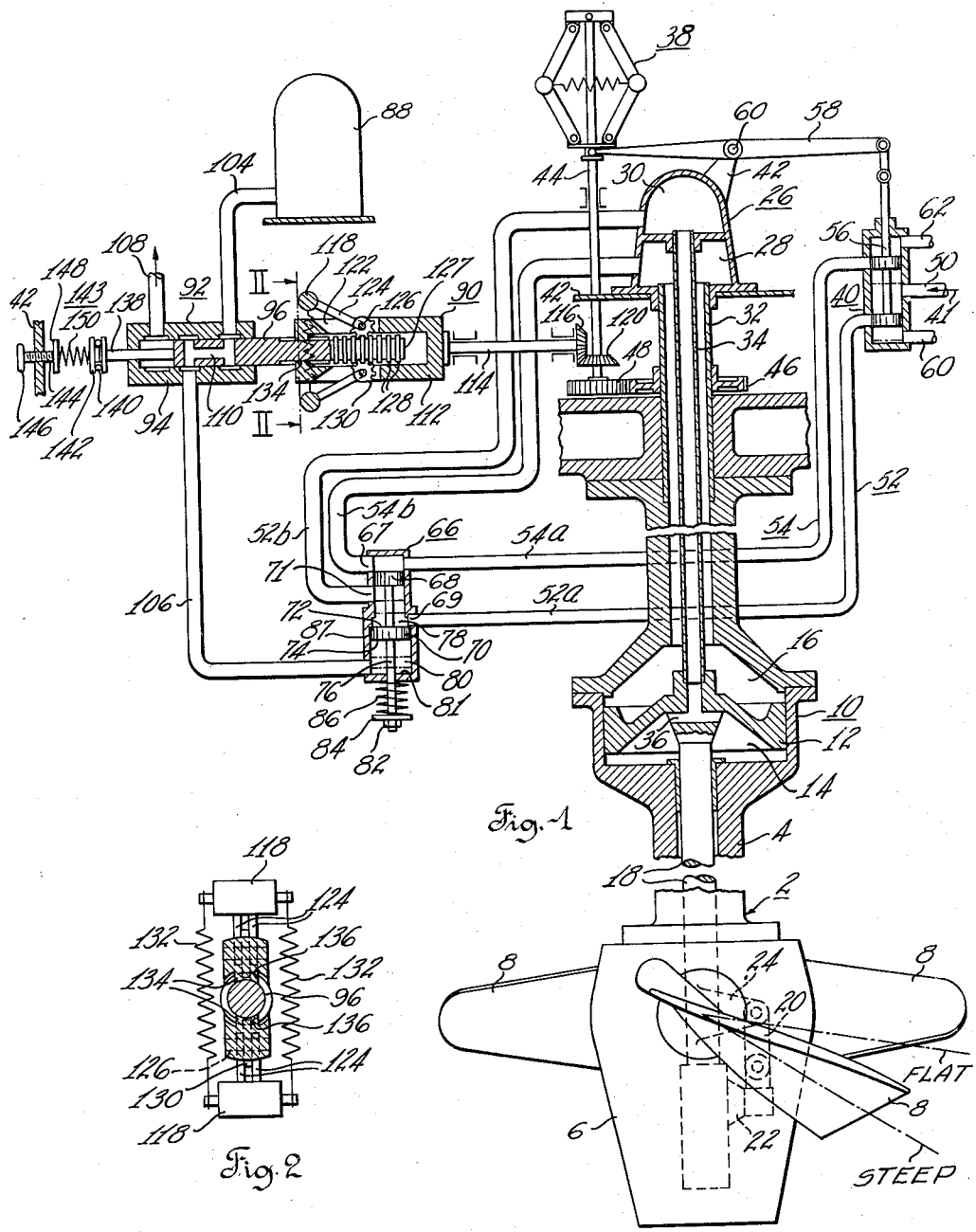

2,937,888

ARRANGEMENT FOR DECREASING MAXIMUM OVERSPEED OF A KAPLAN TURBINE

Beverly R. Nichols, Elm Grove, Wis., assignor to Allis-Chalmers Manufacturing Company, Milwaukee, Wis.

Filed Oct. 12, 1956, Ser. No. 615,613

7 Claims. (Cl. 253—143)

This invention relates to a hydraulic turbine of the Kaplan or adjustable blade type, and more particularly to an arrangement for decreasing runaway speed of the turbine runner.

When a hydraulic turbine runner runs away, due to operating fluid pressure failure, failure of the governor, etc., its speed does not increase to infinity as does the rotor of a steam turbine. The speed of a hydraulic turbine runner increases to a certain point depending on the position of the blades, and does not increase thereafter. The generator rotated by the hydraulic turbine runner must be designed to withstand the centrifugal forces encountered when the blades are in the position providing the maximum runaway speed.

Reducing the maximum runaway speed of the turbine runner would result in a great saving of money, since a relatively small reduction in maximum runaway speed would reduce the cost of the generator by a rather large percentage of total cost of the generator, as well as decrease the wear and tear on the turbine. Unfortunately the characteristics of a Kaplan turbine are such that the adjustable blades carried in the hub of the turbine runner are usually in a position providing the highest overspeed when the turbine runs away.

The position of the blades of a Kaplan turbine is varied with changes in load on the turbine by a control governor operating a control pilot valve regulating flow of operating fluid to a runner servomotor. The runner servomotor moves the blades to the position providing maximum efficiency of the turbine at each load. As the load on the turbine runner varies, the blades rotate between a flat and a steep position, i.e., a position between four and five o'clock. The flat or four o'clock position is the position the blades approach when the load is reduced. The steep or five o'clock position is the position the blades approach when load is increased. Assuming all factors are the same the turbine runner will rotate, at its maximum runaway speed when the blades are between the steep and flat position, at a slightly lower runaway speed when the blades are in the flat position and at the lowest runaway speed when the blades are in the steep position. The control governor, although providing maximum efficiency as load on the turbine varies, is a disadvantage when the turbine runner runs away because the blades are normally maintained in the positions yielding maximum runaway speed.

The present invention embodies the concept of decreasing the maximum runaway speed of the turbine runner by moving the blades of the turbine runner to their steep position when the turbine runner begins overspeeding thereby reducing the maximum runaway speed.

Conventionally, the blades of a turbine are hydraulically balanced so water pressure on the blades urges the blades to a position between the steep and flat positions. This is the neutral position for the blades. That is, if the blades are moved away from the neutral position toward the flat or steep position, water pressure will urge the blades back toward the neutral position between the steep and flat position. This design equalizes the amount of force employed in moving the blades from the neutral position toward either the steep or flat position. However, when a turbine runner runs away, the force of the water pressure on the blades urges the blades toward the steep rather than the neutral position. In the present arrangement the blades of the hydraulic turbine are hydraulically balanced to accentuate this force, and are designed so they are continually urged toward the steep rather than the neutral position by the water pressure, so there is always a positive force urging the blades toward the steep position. In addition, control means are provided overriding the control governor, venting the operating fluid from the runner servomotor allowing the water pressure on the blades to move the blades to the steep position when the turbine runner starts running away.

An object of this invention is providing an arrangement decreasing runaway speed of the turbine runner by shifting the blades to a steep position when the turbine runner begins overspeeding.

Another object of this invention is providing an adjustable arrangement decreasing runaway speed of the turbine runner becoming effective when the turbine runner reaches a preselected overspeed when running away.

Another object of this invention is providing an arrangement decreasing runaway speed of the turbine runner requiring little maintenance for long periods of time.

Another object of this invention is providing an arrangement decreasing runaway speed of the turbine runner easily tested, determining its operability while the turbine is in operation.

Other objects and advantages will appear from the following description considered in conjunction with the attached drawings, in which:

Fig. 1 is a diagrammatic view of the turbine runner control system and the arrangement for moving the turbine blades to their steep position; and Fig. 2 is a cross section of a portion of the overspeed governor illustrating the connection of the piston of the overspeed pilot valve to the overspeed governor.

Referring to Fig. 1 there is disclosed a conventional turbine runner 2 comprising a hollow runner shaft 4 ending in a hub 6 having turbine blades 8 rotatably mounted therein. Blades 8 are rotated by runner servomotor 10 carried within said turbine runner. The runner servomotor contains a double acting piston 12 dividing the servomotor into two chambers 14 and 16. Chamber 16 is larger than chamber 14 due to piston rod 18 connected to runner piston 12 in chamber 14.

Any means may be employed connecting piston rod 18 to blades 8. As shown, link 20 is pivotally connected to arm 22 on runner piston rod 18 and to arm 24 on blade 8. There will, of course, be a link 20, arm 22 and arm 24 for each blade connection.

Inasmuch as the runner servomotor rotates with the turbine runner, a stationary header 26 is provided interconnecting the rotating runner servomotor with operating fluid. Header 26 is divided into portions 28 and 30. Header portion 28 rotatably receives tube 32 extending from upper chamber 16 of the runner servomotor. Operating fluid introduced into header portion 28 flows through tube 32 into upper chamber 16 moving servomotor piston 12 downwardly (as viewed in Fig. 1), moving blades 8 toward the steep position. Header portion 30 receives a tube 34 carried concentrically within tube 32. Tube 34 is connected to, and is moved up and down with, runner piston 12. An opening 36 is provided in the runner piston permitting passage of operating fluid through the runner piston into lower chamber 14 of the runner servomotor. Operating fluid introduced into header portion 30 flows through tube 34 and opening 36 into lower chamber 14 moving piston 12 upwardly (as viewed in Fig. 1), moving blades 8 toward the flat position.

The position of the blades is controlled by control governor 38 operated by changes in speed due to changes in load on the turbine runner. The control governor operating control pilot valve 40 directing flow of operating fluid from a sump (not shown) serves as a source of operating fluid 41 to the runner servomotor. The control governor is rotated by shaft 44 rotatably supported by a portion 42 of the turbine frame. Shaft 44 carries a gear 48 rotated by a gear 46 fixed to the turbine runner. Rotation of the turbine runner will be transmitted through gears 46, 48 and shaft 44 to the control governor.

Control pilot valve 40 is connected to the source of operating fluid 41 by conduit 50, and is connected to turbine runner header 26 by first conduit 52 and second conduit 54. The position of piston 56 of the control pilot valve determines through which conduit, 52 or 54, operating fluid flows, and the direction the runner piston will be moved. Piston 56 of the control pilot valve is connected to control governor 38 by link 58 pivotally supported at 60 by a portion 42 of the turbine frame. The control pilot valve as shown in solid lines in Fig. 1 is in the neutral position. This is the position in which the blades are held stationary. As load on the turbine increases and the speed of the turbine runner decreases, piston 56 will be moved upwardly by the control governor connecting conduit 54 to the source of operating fluid 41 and conduit 52 to return outlet 60 connected to the operating fluid sump. When load on the turbine decreases and the speed of the turbine runner increases, piston 56 will be moved downwardly (as shown in dotted lines) connecting conduit 52 to the source of operating fluid 41 and conduit 54 to return outlet 62 also connected to the operating fluid sump. As is conventional, a restoring arrangement (not shown) is provided moving piston 56 back to its neutral position after blades 8 have moved to their new position. The above is well known in the art.

The control means allowing water pressure to move the blades to the steep position when the turbine starts running away comprises: a housing containing an intercept means and means moving said intercept means, said moving means, during normal operation of the turbine runner, moving said intercept means to a first position allowing uninterrupted flow of operating fluid to chamber 14 of said runner servomotor; and when said turbine runner overspeeds, moving said intercept means to a second position blocking the source of operating fluid while connecting the operating fluid in chamber 14 of the runner servomotor to an outlet.

The housing retaining said intercept means may comprise a housing 66 containing an outlet 67 and offset ports 69, 71. The housing divides conduit 52 into portions 52a, 52b and conduit 54 into conduit portions 54a, 54b. Conduit portion 52a connects port 69 to pilot valve 40 and the source of operating fluid 41, and portion 52b connects port 71 to runner servomotor 10. Conduit portions 54a, 54b are connected to outlet 67 in housing 66.

The intercept means comprises a partition piston 68 movable between two positions in housing 66. During normal operation of the turbine runner partition piston 68 is maintained in a first position (shown in solid lines in Fig. 1) acting as a partition separating conduit 52 from outlet 67 and conduit 54, permitting uninterrupted flow of operating fluid through either conduit. When the turbine runner starts overspeeding, partition piston 68 is moved to a second position (shown in dotted lines in Fig. 1) between ports 69, 71 preventing flow of operating fluid from conduit portion 52a, now connected to the source of operating fluid 41 by control pilot valve piston 56, to conduit portion 52b connected to chamber 14 of the runner servomotor. Additionally, when the partition piston moves to the second position, it interconnects conduit portion 52b connected to chamber 14 with outlet 67 and conduit 54. The operating fluid, in lower chamber 14 of runner servomotor 10 resisting the force of the water pressure attempting to move blades 8 to their steep position, exists through opening 36, tube 34, header portion 30 to conduit portion 52b, outlet 67, conduit 54b, header portion 28, tube 32 and then to chamber 16.

Inasmuch as chamber 16 is larger than chamber 14, when runner piston 12 moves downwardly, chamber 16 can draw additional operating fluid from the operating fluid sump, through conduit portion 54a, control pilot valve 40 and return outlet 62 connected to the sump. Control pilot valve piston 56 is maintained in the dotted position when the turbine runner runs away. Although outlet 67 is connected to conduit 54, it need not be, and can be connected directly to a sump, in which case conduit portion 54a can be made large so chamber 16 can draw all of the operating fluid from the operating fluid sump, as runner piston 12 moves downwardly moving blades 8 to the steep position.

For purposes of illustration housing 66 is shown separated from header 26, conduit portions 52b, 54b connecting housing 66 to header 26. Obviously, housing 66 can be connected directly to header 26 eliminating conduit portions 52b, 54b. It is further noted that conduit portions 52b, 54b, port 71 and outlet 67 are made of such size that operating fluid may exit quickly from chamber 14 allowing water pressure to move blades 8 to steep position in a few seconds.

Any means distinguishing between normal speed and overspeed of the turbine runner may be provided moving the partition piston between its two positions. In the embodiment shown, there is provided means continuously biasing the partition piston to the second position, means moving and maintaining the partition piston in the first position during normal operation of the turbine runner overcoming the biasing means, and finally, overspeed means operable when the turbine runner overspeeds rendering the means maintaining the partition piston in its first position ineffective and no longer able to prevent the biasing means moving said partition piston to its second position.

The means continuously biasing partition piston 68 to the second position may comprise a second and larger piston 70 movable within housing 66. Said larger piston is spaced from partition piston 68, but joined to the partition piston by piston rod 76. Partition piston 68 and larger piston 70 form two spaced pistons movable as a unit. Piston 70 has two surfaces 72, 74. A first compartment 78 is formed between partition piston 68 and surface 72 of piston 70 and a second compartment 80 is formed between end surface 81 of housing 66 and surface 74 of piston 70. When spaced pistons 68, 70 are in the first position (shown in solid lines in Fig. 1) ports 69, 71 are connected into compartment 78. When the spaced pistons are in the second position (shown in dotted lines), port 71 is connected to outlet 67 and no longer connected into compartment 78. Conduit portion 52a connected to port 69, however, is connected into compartment 78 when spaced pistons 68, 70 are in the first or second position. Therefore, since conduit 52a is always connected into compartment 78, there will always be operating fluid pressure in compartment 78. Inasmuch as piston 70 has a larger surface 72 exposed to the operating fluid pressure in compartment 78 than partition piston 68, there is a greater force on piston 70 than on piston 68. Due to the differential in forces on the two spaced pistons, larger piston 70 therefore continuously urges partition piston 68 to the second position.

In the event operating fluid pressure in conduit 52 is insufficient to move piston 70 and the partition piston to the second position when, for example, there is a break in conduit 52, additional biasing means may be provided biasing the partition piston to its second position.

The additional biasing means comprise a spring. The end of piston rod 76 connecting pistons 68 and 70 extends beyond housing 66, carrying a nut 82 threaded to the end of the piston rod. Nut 82 acts as a stop for abutment plate 84 carried on piston rod 76 between nut 82 and housing 66. Carried between abutment plate 84 and housing 66 is spring 86. Spring 86 urges abutment plate 84 away from housing 66, biasing piston rod 76 which carries spaced pistons 68, 70 toward said second position.

Any means moving and maintaining the partition piston in the first position may be provided for overcoming the biasing means during normal operation of the turbine runner. In the embodiment disclosed, the means for moving and maintaining the partition piston in the first position may comprise surface 74 of larger piston 70 and hydraulic fluid pressure introduced into compartment 80 in housing 66, the hydraulic fluid pressure overcoming the combination of the operating fluid pressure in compartment 78 and spring 86. The hydraulic fluid pressure moves large piston 70 against a stop 87 in housing 66, positioning and maintaining the partition piston in said first position.

Any means responsive to overspeeding of the turbine runner may be provided rendering said means overcoming said biasing means ineffective permitting the biasing means moving the partition piston to the second position. In the embodiment disclosed, overspeed governor 90 operates a piston 96 of an overspeed pilot valve 92 regulating flow of hydraulic fluid to chamber 80 of housing 66. When the turbine runner overspeeds, the overspeed governor moves the piston of the overspeed pilot valve to a position permitting hydraulic fluid in compartment 80 of housing 66 to escape allowing the biasing means to move larger piston 70 and partition piston 68 to the second position.

The overspeed pilot valve comprises a body 94 having a movable piston 96 therein. The overspeed pilot valve body has a conduit 104 connecting it to source 88 of the hydraulic fluid, a conduit 106 connecting it to compartment 80 of housing 66 and a return conduit 108 acting as a vent for hydraulic fluid in compartment 80 of housing 66.

Piston 96 of the overspeed pilot valve has an H-shaped orifice 110 in it movable between a normal and a vent position. In Fig. 1 the legs of the H-shaped orifice are shown in their normal position connecting conduits 104 and 106 interconnecting source 88 of hydraulic fluid and compartment 80 of housing 66. The hydraulic fluid pressure on surface 74 of large piston 70 overcomes the operating fluid pressure on the opposite surface 72 of piston 70 in combination with spring 86, moving pistons 68 and 70 to the first position and maintaining them in this position. When H-shaped orifice 110 is moved to its vent position, it interconnects conduit 106 of compartment 80 with return conduit 108, venting compartment 80 of hydraulic fluid. Operating fluid pressure in compartment 78 and spring 86 moves pistons 68, 70 to their second position while forcing hydraulic fluid out of compartment 80, through conduit 106, H-shaped orifice 110 and return conduit 108 of the overspeed pilot valve.

Overspeed governor 90 operating overspeed pilot valve 92 comprises: a hollow housing 112, a shaft 114 connected to housing 112 carrying a bevel gear 116, and flyweights 118 carried by rods 124 pivotally supported at 126 in openings 122 in opposite sides of housing 112. Shaft 44 which rotates control governor 38 also carries a gear 120 rotating gear 116 carried on the end of overspeed governor shaft 114. Received within hollow housing 112 is end 127 of piston 96 of the overspeed pilot valve. End 127 is provided with a series of ridges 128 in its periphery. A series of teeth 130 provided on the ends of pivoted rods 124 engage between ridges 128 on piston 96 coacting in the manner of a rack and pinion. Centrifugal force acting on flyweights 118 rotates rods 124 about pivots 126 shifting piston 96 to the vent position. Springs 132 (Figs. 1 and 2) interconnect the flyweights returning them to their original position as centrifugal force decreases.

Opposing movement of overspeed pilot valve piston 96 to the left (as viewed in Fig. 1) to vary the overspeed of the turbine runner at which overspeed pilot valve piston 96 is shifted to its vent position, are adjustable yieldable means (indicated generally at 143).

The adjustable yieldable means comprise a spring opposing movement of the overspeed pilot valve piston and a threaded screw member for adjusting the force on the spring. Carried by end 138 of overspeed pilot valve piston 96 is a bearing 140 carrying a support plate 142. The bearing allows piston 96 to rotate relative to support plate 142. Carried by a portion 42 of the turbine frame opposing support plate 142 is screw 144 having handle 146 at one end and support plate 148 engaging a spring 150 at the other end. Spring 150, attempting to expand, is sandwiched between opposing support plates 142, 148. Decreasing the force on spring 150 permits piston 96 to be moved to the vent position by a smaller centrifugal force obtained at a lower speed of rotation of the turbine runner, while increasing the force on spring 150 will necessitate the turbine runner rotating at a higher speed to build up the required centrifugal force necessary to shift piston 96 to said vent position. Therefore, by adjusting screw 144, the overspeed of the turbine runner at which overspeed pilot valve piston 96 is moved to its vent position may be preselected.

A hydraulic turbine does not run away very often. Piston 96 of the overspeed pilot valve will therefore remain in the same position for long periods of time. Due to this relative inaction, the openings in the overspeed pilot valve may quite easily become clogged with foreign matter preventing the pilot valve from operating when it is most needed. To remedy this, the control pilot valve is made self-cleaning.

Housing 112 of overspeed governor 90 is provided with projections 134 (Figs. 1 and 2) extending into longitudinal guideways 136 provided in the surface of piston 96. This arrangement keys piston 96 and housing 112 together so the overspeed pilot valve piston rotates with the overspeed governor, while permitting piston 96 to reciprocate relative to housing 112. Foreign matter which ordinarily accumulates blocking an ordinary pilot valve will be trapped and ground up between rotating piston 96 and housing 94 of the overspeed pilot valve, thus rendering the overspeed pilot valve self-cleaning.

It is necessary to periodically test the arrangement for decreasing overspeed to determine whether it is in working condition. It is obviously desirable to perform this test without taking the turbine out of operation, or causing the turbine runner to overspeed.

Testing of the arrangement for decreasing overspeed may be accomplished by rotating hand wheel 146 decreasing the force of threaded screw 144 on spring 150 opposing the centrifugal force on flyweights 118. When the force on the spring is reduced, the flyweights 118 will move outwardly without an increase in speed of the turbine runner moving piston 96 to its vent position. If everything is in working order, pilot valve piston 96 will move to the vent position venting compartment 80 of housing 66 of its hydraulic fluid so partition piston 68 can be moved by the biasing means to its second position. Once it has been determined that everything is in operating condition the force on spring 150 can be reapplied moving piston 96 back to its normal position.

In summary, during normal operation, partition piston 68 and large piston 70 are in their first position, partition piston 68 separating conduit 52 from outlet 67 and conduit 54, permitting uninterrupted flow of operating fluid through either conduit. Overspeed pilot valve piston 96 is also in its normal position connecting source 88 of hydraulic fluid through conduits 104, 106 with compartment 80, maintaining piston 68 in said first position.

When the turbine runner begins overspeeding, flyweights 118 of overspeed governor 90 will move outwardly overcoming spring 150 shifting piston 96 of the overspeed pilot valve to its vent position. Piston 96 will then interconnect conduit 106 of compartment 80 with return conduit 108 venting compartment 80. The hydraulic fluid in compartment 80 of housing 66 flows to return conduit 108. Spring 86 and the pressure of operating fluid in compartment 78 act on surface 72 of piston 70 moving pistons 68 and 70 to their second position. Partition piston 68 in its second position separates ports 69 and 71 blocking conduit portion 52a from conduit portion 52b, and interconnects conduit portion 52b connected to runner servomotor chamber 14 with outlet 67 and conduit 54. Partition piston 68 in its second position prevents additional flow of operating fluid to runner servomotor chamber 14 while interconnecting chamber 14 with outlet 67 allowing escape of operating fluid from servomotor chamber 14.

When servomotor chamber 14 is connected to outlet 67 the water pressure on blades 8 moves runner piston 12 downwardly forcing said operating fluid from chamber 14 to chamber 16 of the runner servomotor through opening 36 in runner piston 12, tube 34, header portion 30, conduit portion 52a, port 71, outlet 67, conduit portion 54b extending from housing 66 to header portion 28, and then through tube 32 to chamber 16.

The above invention permits a great saving in money in constructing the turbine and generator, since they need no longer be designed to withstand the centrifugal forces encountered at the maximum runaway speed, the blades being moved to the position yielding the lowest runaway speed when the turbine runner begins running away.

Although but a single embodiment of the present invention has been illustrated and described, it will be apparent to one skilled in the art that various changes and modifications may be made therein without departing from the spirit of the invention or from the scope of the appended claims.

What is claimed is:

1. An arrangement for decreasing overspeed of a turbine runner having blades mounted in the hub of the turbine runner rotatable between a steep and a flat position, said blades hydraulically balanced so water pressure continually urges said blades toward said steep position, comprising: a runner servomotor supported by said runner, said runner servomotor having a piston and a piston rod extending from said piston, means connecting said piston rod to said blades to rotate said blades in response to movement of said piston, a source of operating fluid, fluid conducting means connecting said source of operating fluid to said servomotor on both sides of said piston, speed sensing means connected to said runner, control means positively connected to said speed sensing means and included in said fluid conducting means, said control means selectively operated by said speed sensing means to admit fluid pressure to said servomotor on one side of said piston, said piston being movable solely by fluid pressure within said servomotor and water pressure upon said blades of said runner, said fluid conducting means including intercept means between said control means and said servomotor, said intercept means comprising a housing and a movable member within said housing, a first pair of conduits providing fluid communication between said housing and said control means, said control means responding to increasing speed sensing action of said speed sensing means to connect one of said first pair of conduits to drain and the other conduit of said first pair of conduits to said source of fluid pressure, a second pair of conduits, one of said second pair of conduits providing fluid communication between said housing and said servomotor on one side of said piston and the other conduit of said second pair of conduits providing fluid communication between said housing and said servomotor on the other side of said piston, said movable member having a first position and a second position, said member in said first position defining a passage connecting said drain conduit of said first pair of conduits to one of said second pair of conduits and a passage connecting said pressure conduit of said first pair of conduits to the other conduit of said second pair of conduits, said movable member in said second position blocking the pressure conduit of said first pair of conduits and defining a passage connecting both conduits of said second pair of conduits to said drain conduit of said first pair of conduits, biasing means connected to said movable member and continuously biasing said member to said second position, flyball type overspeed sensing means positively connected to said runner, pilot valve means having a pilot valve piston positively connected to said flyball type overspeed sensing means to rotate with said overspeed sensing means and hydraulically interconnecting said flyball type overspeed sensing means and said movable member and responding to normal speed action of said turbine to overcome said biasing means and to move said member to said first position, said flyball type overspeed sensing means responding to overspeed action of said turbine to render said pilot valve means ineffectual to overcome said biasing means, said biasing means moving said member from said first to said second position and releasing fluid pressure from said servomotor on both sides of said piston, said water pressure on said blades moving said runner servomotor piston and said blades to said steep position.

2. An arrangement for decreasing overspeed of a turbine runner having blades mounted in the hub of the turbine runner rotatable between a steep and a flat position, said blades hydraulically balanced so water pressure continually urges said blades toward said steep position, comprising: a runner servomotor supported by said runner, said runner servomotor having a piston and a piston rod extending from said piston, means connecting said piston rod to said blades to rotate said blades in response to movement of said piston, a source of operating fluid, fluid conducting means connecting said source of operating fluid to said servomotor on both sides of said piston, speed sensing means positively connected to said runner, control means positively connected to said speed sensing means and included in said fluid conducting means, said control means selectively operated by said speed sensing means to admit fluid pressure to said servomotor on one side of said piston, said piston being movable solely by fluid pressure within said servomotor and water pressure upon said blades of said runner, said fluid conducting means including intercept means between said control means and said servomotor, said intercept means comprising a housing and a movable member within said housing, a first pair of conduits providing fluid communication between said housing and said control means, said control means responding to increasing speed sensing action of said speed sensing means connected to said turbine runner to connect one of said first pair of conduits to drain and the other of said first pair of conduits to said source of fluid pressure, a second pair of conduits, one of said second pair of conduits providing fluid communication between said housing and said servomotor on one side of said piston and the other conduit of said second pair of conduits providing fluid communication between said housing and said servomotor on the other side of said piston, said conduit of said first pair of conduits that carries pressure upon increasing speed being offset at said housing from said second pair of conduits in the direction that said second pair of conduits is disposed at said housing from said drain conduit of said first pair of conduits, said movable member having a first position and a second position, said member in said first position defining a passage connecting said drain conduit of said first pair of conduits to one of said second pair of conduits and a passage connecting said pressure conduit of said first pair of conduits to the other conduit of said second pair of conduits, said movable member in said second position blocking the pressure conduit of said first pair of conduits defining a passage connecting both conduits of said second pair of conduits to said drain conduit of said first pair of conduits, flyball type overspeed sensing means positively connected to said runner and responding to overspeed action of said turbine runner, biasing means hydraulically connected with said movable member, said biasing means continuously biasing said member to said second position, and pilot valve means having a pilot valve piston positively connected to said flyball type overspeed sensing means to rotate with said overspeed sensing means and hydraulically connected with said movable member and responding to normal speed action of said turbine to overcome said biasing means and to move said member to said first position, said flyball type overspeed sensing means responding to overspeed action of said turbine to render said pilot valve means overcoming said biasing means ineffectual, said biasing means moving said member from said first to said second position and releasing fluid pressure from said servomotor on both sides of said piston, and said water pressure on said blades moving said runner servomotor piston and said blades to said steep position.

3. An arrangement for decreasing overspeed of a turbine runner having blades mounted in the hub of the turbine runner rotatable between a steep and a flat position, said blades hydraulically balanced so water pressure continually urges said blades toward said steep position, comprising: a runner servomotor supported by said runner, said runner servomotor having a piston and a piston rod extending from said piston, means connecting said piston rod to said blades to rotate said blades in response to movement of said piston, a source of operating fluid, fluid conducting means connecting said source of operating fluid to said servomotor on both sides of said piston, speed sensing means positively connected to said runner, control means positively connected to said speed sensing means and included in said fluid conducting means, said control means selectively operated by said speed sensing means to admit fluid pressure to said servomotor on one side of said piston, said piston being movable solely by fluid pressure within said servomotor and water pressure upon said blades of said runner, said fluid conducting means including intercept means between said control means and said servomotor, said intercept means comprising a housing and a movable member within said housing, a first pair of conduits providing fluid communication between said housing and said control means, said control means responding to increasing speed sensing action of said speed sensing means positively connected to said turbine runner to connect one of said first pair of conduits to drain and the other of said first pair of conduits to said source of fluid pressure, a second pair of conduits, one of said second pair of conduits providing fluid communication between said housing and said servomotor on one side of said piston and the other conduit of said second pair of conduits providing fluid communication between said housing and said servomotor on the other side of said piston, said conduit of said first pair of conduits that carries pressure upon increasing speed being offset at said housing from said second pair of conduits in a direction that said second pair of conduits is disposed at said housing from said drain conduit of said first pair of conduits, said movable member having two spaced pistons joined by a common piston rod, one of said pistons having a larger surface exposed to said fluid pressure than the other piston, said movable member having a first position and a second position, said member in said first position having said smaller piston define a passage connecting said conduit that drains upon increasing speed of said first pair of conduits to one of said second pair of conduits and the space between said pistons defines a passage connecting said conduit that carries pressure upon increasing speed of said first pair of conduits to the other conduit of said second pair of conduits, said movable member in said second position having said smaller piston blocking flow from the pressure conduit of said first pair of conduits to said second pair of conduits and define a passage connecting both conduits of said second pair of conduits to said drain conduit of said first pair of conduits, biasing means hydraulically connected with said movable member, said biasing means continuously biasing said member to said second position, flyball type overspeed sensing means positively connected to said runner, pilot valve means containing a pilot valve piston positively connected to said flyball type speed sensing means to rotate with said overspeed sensing means and hydraulically interconnected with said movable member and responding to normal speed sensing action of said flyball type overspeed sensing means positively connected to said turbine to overcome said biasing means and to move said member to said first position, said flyball type overspeed sensing means responding to overspeed action of said turbine to render said pilot valve means overcoming said biasing means ineffectual, said biasing means moving said member from said first to said second position and releasing fluid pressure from said servomotor on both sides of said piston, said water pressure on said blades moving said runner servomotor piston and said blades to said steep position.

4. An arrangement for decreasing overspeed of a turbine runner having blades mounted in the hub of said turbine runner rotatable between a steep and a flat position, said blades hydraulically balanced so water pressure continually urges said blades toward said steep position, comprising: a runner servomotor supported by said runner, said runner servomotor having a piston and a piston rod extending from said piston, means connecting said piston rod to said blades to rotate said blades in response to movement of said piston, a source of operating fluid, fluid conducting means connecting said source of operating fluid to said servomotor on both sides of said piston, speed sensing means positively connected to said turbine runner, control means in said fluid conducting means connected to said speed sensing means, said control means selectively operated by said speed sensing means to admit fluid pressure to said servomotor on one side of said piston, said piston being movable solely by fluid pressure within said servomotor and water pressure upon said blades of said runner, said fluid conducting means including an intercept assembly between said control means and said servomotor, said intercept assembly comprising a housing and a movable member within said housing, said member comprising two spaced pistons joined by a common piston rod, one piston of said spaced pistons having a larger surface exposed to said fluid pressure than the other piston, a first pair of conduits providing fluid communication between said housing and said control means, said control means responding to increasing speed of said turbine runners sensed by said speed sensing means to connect one of said first pair of conduits to drain and the other of said first pair of conduits to said source of fluid pressure, a second pair of conduits, one of said second pair of conduits providing fluid communication between said housing and said servomotor on one side of said servomotor piston and the other conduit of said second pair of conduits providing fluid communication between said housing and said servomotor on the other side of said servomotor piston, said spaced intercept pistons having a first position and a second position, said spaced intercept pistons in said first position defining a passage connecting said drain conduit of said first pair of conduits to one conduit of said second pair of conduits and a passage connecting said pressure conduit of said first pair of conduits to the other conduit of said second pair of conduits, said spaced intercept pistons in said second position blocking flow to said second pair of conduits from the pressure conduit of said first pair of conduits and defining a passage connecting both conduits of said second pair of conduits to said drain conduit of said first pair of conduits, said operating fluid pressure between said spaced pistons continually biasing said piston of larger area toward said second position, a source of hydraulic fluid, said larger piston cooperating with said housing forming a compartment for reception of said hydraulic fluid, a flyball type overspeed governor positively connected to said turbine runner and responsive to overspeeding of said turbine runner, an overspeed pilot valve having a piston positively connected to said flyball type overspeed governor to rotate with said overspeed governor and moved by said flyball type overspeed governor controlling flow of said hydraulic fluid to said compartment, said overspeed pilot valve piston during normal operation of the turbine runner admitting hydraulic fluid to said compartment moving said larger piston against said pressure of said operating fluid on said larger of said spaced pistons moving said spaced pistons to said first position and maintaining them in said first position, said flyball type overspeed governor on overspeeding of said turbine runner moving said overspeed pilot valve piston to a position venting said compartment of said hydraulic fluid, said operating fluid pressure on said larger of said spaced pistons moving said spaced pistons to said second position and releasing fluid pressure from said servomotor on both sides of said servomotor piston, said water pressure on said blades moving said runner servomotor piston against said operating fluid in said runner servomotor forcing said operating fluid out said outlet port of said first pair of ports while moving said blades to said steep position.

5. A device as set forth in claim 4 wherein said piston rod in said housing having said spaced pistons is provided with additional means connected to said rod and said housing to bias said spaced pistons toward said second position, said additional means moving said piston rod and spaced pistons to said second position when said overspeed pilot valve vents said compartment in said housing of said hydraulic fluid and the differential in pressure caused by said operating fluid pressure on said larger of said spaced pistons is insufficient to move said spaced pistons to said second position.

6. A device as set forth in claim 4 wherein said overspeed pilot valve piston positively connected to and moved by said flyball type overspeed governor is keyed to said flyball type overspeed governor, said flyball type overspeed governor rotating said overspeed pilot valve piston, said overspeed pilot valve piston on rotating grinding up foreign matter trapped between said overspeed pilot valve piston and said overspeed pilot valve housing rendering said overspeed pilot valve self-cleaning.

7. A device as set forth in claim 4 wherein adjustable yieldable means are provided connected to said overspeed pilot valve piston to vary the overspeed of the turbine runner at which the overspeed pilot valve piston is moved to its vent position, said adjustable yieldable means carried by said turbine frame in a position opposing movement of said piston of said overspeed pilot valve toward its vent position, said adjustable yieldable means preventing said flyball type overspeed governor moving said piston of said overspeed pilot valve to its vent position until said turbine runner rotates at a preselected overspeed providing the necessary centrifugal force overcoming said adjustable yieldable means moving said piston to its vent position.

References Cited in the file of this patent

UNITED STATES PATENTS

| 2,100,580 | Thoma | Nov. 30, 1937 |
| 2,227,417 | Ring et al. | Dec. 31, 1940 |
| 2,283,127 | Rheingans | May 12, 1942 |
| 2,824,716 | Voaden | Feb. 25, 1958 |
| 2,840,344 | Stage | June 24, 1958 |

FOREIGN PATENTS

| 1,119,930 | France | Apr. 9, 1956 |